United States Patent

Schoenewaldt

[15] 3,689,508

[45] Sept. 5, 1972

[54] 2-HALO-1,2-EPOXYPROPYLPHOSPHONIC ACID AND DERIVATIVES

[72] Inventor: Edwin F. Schoenewaldt, Watchung, N.J.

[73] Assignee: Merck & Co., Inc., Rahway, N.J.

[22] Filed: Jan. 7, 1971

[21] Appl. No.: 104,787

Related U.S. Application Data

[62] Division of Ser. No. 729,414, May 15, 1968, abandoned.

[52] U.S. Cl. ............... 260/348 R, 260/999, 260/956, 260/924, 260/986, 260/502.4 R, 260/543 P

[51] Int. Cl. .............................. C07f 9/38, C07f 9/40
[58] Field of Search ................................. 260/348 R

*Primary Examiner*—Norma S. Milestone
*Attorney*—J. Jerome Behan et al.

[57] ABSTRACT

(±)- and (−)-(cis-1,2-epoxypropyl)-phosphonic acids and non-toxic salts thereof are prepared by a dehalogenation process comprising reacting a 1,2-epoxypropylphosphonic acid compound substituted at the 2- position with halogen, with a dehalogenating agent. (±)- and (−)-(cis-1,2-epoxypropyl)-phosphonic acids and salts thereof are active antibiotic agents.

5 Claims, No Drawings

2-HALO-1,2-EPOXYPROPYLPHOSPHONIC ACID AND DERIVATIVES

This application is a division of Ser. No. 729,414, filed May 15, 1968 and now abandoned.

DESCRIPTION OF THE PREFERRED EMBODIMENTS ($\pm$)- and (−)−1,21,1-epoxypropyl)-phosphonic acids and their salts can be prepared by a dehalogenation process which may be depicted as follows:

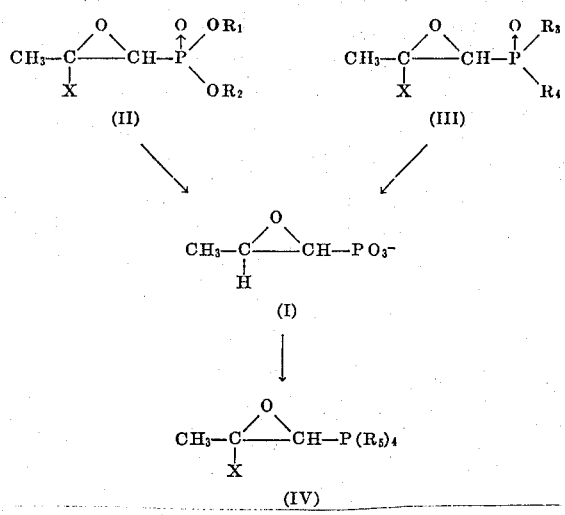

where X is bromo, chloro and iodo; $R_1$ and $R_2$ are the same or different hydrogen, aryl such as phenyl and naphthyl, substituted aryl such as nitrophenyl, halophenyl such as chlorophenyl and bromophenyl, loweralkoxyphenyl such as methoxyphenyl and ethoxyphenyl, hydroxyphenyl, tolyl, cyclic o-phenylene, aralkyl such as benzyl, substituted aralkyl such as 3,5-dinitrobenzyl, halobenzyl, alkoxybenzyl, hydroxybenzyl and a-methylbenzyl, alkenyl such as alkyl, substituted allyl such as methallyl, and alkynyl such as propargyl; $R_3$ and $R_4$ are the same chloro or bromo; and $R_5$ is chloro or bromo.

The starting materials II, III and IV) may be a $\mu$-cis- or $\mu$-trans- compound, hereinafter referred to as ($\pm$) (cis- ) or ($\pm$) (trans- ), or they may have the L-cis- or D-trans- configuration. Although the following discussion of the invention is drawn to compounds which can be prepared from starting material having the L-cis- or D-trans- configuration, it should be understood that the hereindescribed dehalogenation process would encompass those compounds where the spacial configuration is other than L-cis- or D-trans-. The dehalogenated product (I) may be obtained directly in the (−) configuration, or a ($\pm$) mixture may be obtained, from which the biologically active isomer may be isolated. "L" refers to the absolute configuration about carbon 2 when referred to L-glyceraldehyde, and (−) refers to the fact that the compound is levorotatory. The oxides (I–IV) are described as cis- or trans- according to whether the terminal groups of the propylphosphonic acid are on the same (cis-) or opposite (trans-) side of the oxide ring.

Dehalogenation may be carried out on the free acid mono- and di- salts, diesters and salts of the monoesters. It is preferred, however, to carry out the reaction on a salt or ester of the acid. Inorganic salts such as the ammonium, sodium, potassium, and calcium salts may be employed as the starting materials, as well as salts of amines such as benzylamine, α-phenethylamine, and triethylamine. Esters such as the phenyl ester, benzyl ester, α-methylbenzyl and p-nitrobenzyl esters, cyclic o-phenylene ester, allyl, and substituted allyl esters, and the propargyl and substituted propargyl esters may be employed. Either a mono- or di- ester may be employed, but where a monoester is used as the starting material, it is preferred to use a salt of the monoester such as, for example, benzyl L-2-chloro-(cis-1,2-epoxypropyl)-phosphonate triethylammonium salt.

(−) (cis-1,2-epoxypropyl)-phosphonic acid (I) has two optically active centers at carbons 1 and 2. Although the biologically active isomer is the one which is levorotatory, the ($\pm$)cis- mixture which is generally obtained where the starting material is a ($\pm$)cis- or, with certain reagents, a ($\pm$)trans- 2-halo-substituted epoxypropylphosphonic acid, is also biologically active. (−) (cis-1,2-epoxypropyl) phosphonic acid may be obtained by resolving the racemate with a suitable resolving agent, such as quinine or (+) or (−) α-phenethylamine. Where the starting compound is L-cis- or, in the case of certain reagents, D-trans-, the dehalogenation process generally yields a mixture from which the (−)cis- compound can be obtained. "L" refers to the absolute configuration about carbon 2 referred to L-glyceraldehyde.

The (−) (cis-1,2-epoxypropyl)-phosphonic acid referred to herein rotates plane-polarized light in a counterclockwise direction (to the left as viewed by the observer) when the rotation of its disodium salt is measured in water ($5\mu$ concentration) at 405 m$\mu$.

The designation cis used in describing the 1,2-epoxypropylphosphonic acid compounds means that each of the hydrogen atoms attached to carbon atoms 1 and 2 of the propylphosphonic acid are on the same side of the oxide ring.

Dehalogenation is effected by treating the halo compound with a dehalogenating agent. The reaction is generally carried out in a solvent, the particular solvent employed depending upon the particular reagent used for dehalogenation. Where the halo substituent is chlorine, bromine, or iodine, dehalogenation generally proceeds without difficulty. However, where the substituent is fluorine, defluorination generally proceeds with some decomposition of the epoxypropylphosphonic acid compound.

The most widely applicable agents which may be employed for the dehalogenation of the compounds of Formula II are metal alloys such as aluminum and magnesium amalgam, magnesium-copper couple, and copper-bronze; alkali metals, such as lithium, potassium, and sodium; and alkaline earth metals, such as calcium and magnesium in combination with a proton source such as an alcohol, for example, t-butanol and t-amyl alcohol. Other widely applicable dehalogenating agents are metal hydrides, such as sodium borohydride, potassium borohydride, lithium aluminum hydride, and/or lithium hydride, lithium trimethoxy aluminum hydride, lithium diethoxy aluminum hydride, organo tin hydrides, and boranes, such as trimethylamine-borane, t-butylamine-borane, dimethylamine-borane, and pyridine-borane. In addition to the above dehalogenating agents, dehalogenation can also be effected through the use of a mixture of copper and ascorbic acid. Reduction with zinc dust, or with a loweralkyl mercaptan such as methylmercaptan, an aryl mercaptan such as thiophenol, or a heteroaryl mercaptan having one to three hetero atoms wherein the hetero atom is sulfur, oxygen or nitrogen such as 2-mercapto-4-methylthiazole, or other reducible sulfur compounds such as the xanthates or thio- acids, is also effective in bringing about dehalogenation. Also contemplated as being within the scope of the present invention are dehalogenation processes which can be effected by catalytic hydrogenation and by electrolytic reduction.

Where dehalogenation is effected through the use of a reducing agent or under hydrogenolytic conditions, that is where dehalogenation is effected through the use of agents such as the alkali metals with a proton source such as ethyl alcohol, or through the use of zinc, metal couples, and alloys, such as aluminum amalgam, magnesium amalgam, and magnesium copper couple, under catalytic hydrogenation, the dehalogenation step also serves to cleave ester groups such as benzyl, substituted benzyl such as nitrobenzyl and halobenzyl, loweralkenyl such as allyl, or substituted allyl such as methallyl, alkynyl such as propargyl, aryl, substituted aryl such as phenyl, nitrophenyl, and cyclic o-phenylene, where the starting halo compound is a mono- or di- ester. Thus, where any of the above agents is employed as the dehalogenating agent, both dehalogenation and ester cleavage will take place where the starting material is a phosphonic acid ester such as, for example, dibenzyl L-2-chloro-(cis-1,2-epoxypropyl)-phosphonate.

Where dehalogenation is effected in an aqueous alkaline medium employing, for example, sodium borohydride as the dehalogenating agent, and a 2-halo-1,2-epoxypropylphosphonic acid dihalide or tetrahalide as the halo compound, the aqueous dehalogenation serves to both remove the 2-halosubstituent and hydrolyze the halogen on the phosphorus to form the 1,2-epoxypropylphosphonic acid compound directly.

Where dehalogenation is effected by catalytic hydrogenation, the halo epoxypropylphosphonic acid compound such as, for example, (±)-2-chloro-(cis-1,2-epoxypropyl)-phosphonic acid is generally treated with hydrogen, which is provided either externally or is generated in situ, in the presence of a catalyst. It is preferred to neutralize any acids generated by maintaining the pH of the reaction mixture at about 5.5, especially where the reaction temperature is above 0°C. and the reaction time is longer than one hour. Where practical, the base is chosen to afford the desired cation where the phosphonic acid is to be isolated as a salt. However, by means of methathasis a great variety of cations are made available which may be exchanged later to yield the desired salt. It is preferred to carry out the hydrogenation within a pH range of 4–12; however, at lower temperatures and/or for shorter periods of time, a pH lower than 4 is permissible.

The preferred catalysts for the catalytic hydrogenation are the noble metals, such as gold and silver, and the Raney metals, such as Raney nickel, Raney copper, and Raney cobalt. The selectivity of these catalysts may be improved by deactivating the catalysts by the addition of poisons, such as sulfur, and basic amines. Some additional typical catalysts which may be employed are copper catalysts, such as copper, copper-chromite, and copper-oxide; nickel catalysts, such as nickel, nickel-magnesium oxide, nickel-sodium hydroxide, nickel-aluminum and nickel-acetic acid; palladium catalysts such as palladium-calcium carbonate, palladium-barium carbonate, palladium-carbon, palladium-carbon/sodium hydroxide, palladium-carbon/triethylamine, and palladium-sodium sulfate; and platinum catalysts, such as platinum black, platinum-on-carbon, platinum-palladium carbon, and platinum oxide. Also contemplated are catalysts such as rhenium, rhodium, and ruthenium. Any suitable solvent such as water, alcohols such as ethanol and methanol, tetrahydrofuran, and benzene may be employed for the hydrogenation. The reaction may be carried out at temperatures ranging from $-40°$–$150°C.$, although it is preferred to carry out the reaction at temperatures between about $0°$–$100°C$. The hydrogenation is generally allowed to proceed until the reaction is complete, as determined by NMR spectroscopy on a sample of the reaction product. The source of hydrogen is generally gaseous hydrogen, and where this source is used the reaction is generally carried out under pressures of from about 1–50 atmospheres, but lower and higher pressures may also be employed. It is preferred, however, to carry out the reaction either at atmospheric pressure or at pressures of about 20 p.s.i.g. Hydrogen may also be supplied by chemical means, such as, for example, with sodium hydroxide and aluminum. The aluminum may be introduced as an alloy of the metal such as, for example, a nickel-aluminum alloy. The dehalogenation generally proceeds with retention of configuration, and the dehalogenated compound (I) is generally isolated as a salt such as, for example, the (±) (cis-1,2-epoxypropyl)-phosphonic acid monobenzylammonium salt.

Where dehalogenation is carried out employing alkali or alkaline earth metals and a proton source as the dehalogenating agent, either the pure metal, for example lithium, sodium, potassium, or calcium, may be employed with a proton source such as t-butanol or t-amyl alcohol, or the alkali or alkaline earth metal may be employed in the form of an amalgam such as sodium or potassium amalgam. The 2-halo epoxide is treated with the alkali or alkaline earth metal and proton source in a suitable solvent, such as tetrahydrofuran, dioxane, diglyme, or ether. The reaction may be carried out at temperatures ranging from $-20°$–$100°C.$, but the preferred temperature range is about $0°$–$40°C$. The reaction time may vary from about 15 minutes to 6 hours or more. It is preferred, however, to carry out the reaction until dehalogenation is complete, as determined by NMR spectroscopy on a sample of the reaction mixture. Generally an amount of the proton source sufficient to react with all of the metal is employed, although it is preferred to use an excess. The dehalogenation proceeds chiefly with retention of configuration, that is, where the starting material is in the cis- configuration, as, for example, in (±)2-chloro-(cis-1,2-epoxypropyl)-phosphonic acid dibenzylammonium salt, the dehalogenated product will also have the cis- configuration.

Where the dehalogenation is carried out using a mercaptan or oxidizable sulfur compound such as thiophenol, methylmercaptan, or 2-mercapto-4-methylthiazole as the dehalogenating agent, the 2-halo epoxide is treated with about 2 equivalents of the oxidizable sulfur compound in a suitable solvent, and an equivalent of an acid binder such as triethylamine, pyridine, or sodium bicarbonate. Any suitable solvent, such as water, alcohol, ethers such as tetrahydrofuran, dioxane, diethyl ether, and diglyme, acetonitrile, dimethylformamide, dimethylsulfoxide, and mixtures of the latter with water may be employed. The reaction may be carried out at temperatures ranging from 0°–50 °C., but it is preferred to carry out the reaction at room temperature. The reaction may proceed quickly or it may take several hours; generally it is preferred to carry out the reaction to completion, as determined by NMR spectroscopy. Although generally applicable as a dehalogenating agent, the oxidizable sulfur compounds are particularly useful where the halogen substituent is iodine. The reaction generally proceeds with retention of configuration, and the dehalogenated compound is generally isolated as a salt such as, for example, the (±) (cis-1,2-epoxypropyl)-phosphonic acid bis-ethylamine salt.

Where dehalogenation is effected with zinc metal, the dehalogenating agent may be employed in the form of zinc dust, zinc foil, a zinc-copper couple, zinc turning, or zinc amalgam. Generally, a solution of the 2-halo epoxide is treated with the dehalogenating agent at a temperature ranging from room temperature to the reflux temperature of the solvent employed. It is preferred, however, to carry out the reaction at a temperature between 40°–80°C. Any polar solvent, such as water, alcohol, dioxane, or dimethylformamide, may be employed for this reaction. Non-polar solvents, such as diethyl ether, may also be employed, but where such is the case a proton source such as ethyl alcohol must also be present. The reaction may be carried out at a pH ranging from neutral to alkaline, but in a non-aqueous medium, dehalogenation may be carried out under acidic conditions. Generally, an excess of the metal is employed, and the reaction is carried out for from about 2–30 hours or until the reaction is complete, as determined by NMR spectroscopy. The reaction generally proceeds with retention of configuration; that is, where the starting halo epoxide has a (±)-2-halo-cis- or (−)-2-halo-cis- configuration, the dehalogenated product obtained will have the cis- configuration. It is preferred to employ an excess of the metal in order to ensure complete dehalogenation. Reduction of the 2 epoxide may be similarly effected with metal couples and alloys other than zinc, such as aluminum amalgam, magnesium amalgam, magnesium-copper couple, and copper-bronze alloy. It is also possible to effect dehalogenation through the use of zinc, amalgams such as zinc, aluminum and mercury, a magnesium-copper couple, tin, amalgamated tin, zinc-magnesium, zinc-copper, or iron-dust in anhydrous solvents such as formic acid, acetic acid, and other lower aliphatic acids. Generally from about 1 molar equivalent to a large excess of the dehalogenating agent is employed, but is is preferred to use from about 2–10 equivalents. The dehalogenation may be carried out at temperatures ranging from about the freezing point of the solvent to the reflux temperature, but it is preferred to carry out the reaction at temperatures ranging from about 20°–60C. A reaction time of from about 30 minutes to 6 hours is generally required for complete dehalogenation, but the reaction is generally allowed to proceed until dehalogenation is complete, as indicated by NMR spectroscopy. In general, the reaction proceeds with retention of configuration, that is, where the starting compound is a (±)-2-halo-cis- or an L-2-halo-cis- compound, the dehalogenated product will have a (±)cis- or the L(−)cis- configuration.

Reduction of the 2-halo epoxide may also be effected through the use of a metal, such as copper, zinc, or tin, and an organic reducing agent, such as ascorbic acid, or a reducing sugar, such as glucose, in an alkaline medium. The metal is generally employed in the form of a powder or turnings, etc., or as an alloy such as, for example, a copper-bronze alloy. An aqueous medium or a mixture of water and water-miscible organic solvents such as loweralkyl alcohols, dioxane, acetonitrile, dimethylformamide, and dimethylsulfoxide, is generally employed for this reduction. The reduction is generally carried out at temperatures ranging from about 50°C. to the reflux temperature of the solvent. The reduction is generally carried out until dehalogenation is complete, as determined by NMR spectroscopy. Generally about 1 equivalent of the organic reducing agent is employed with a catalytic amount of the metal, but larger quantities of the reactants may be employed. This reduction method is particularly effective where the 2-halo epoxide compound is an iodo compound such as, for example, (±)- or L-2-iodo-(cis-1,2-epoxypropyl)-phosphonic acid disodium salt. The reaction generally proceeds with retention of configuration thus where the starting 2-halo epoxide has the cis- configuration, the dehalogenated compound will also have the cis- configuration.

Where reduction of the 2-halo epoxide is effected through the use of a metal hydride, such as sodium borohydride, potassium borohydride, or lithium borohydride, the 2-halo epoxide compound is generally treated with the borohydride in an alkaline medium. Solvents such as water, methanol, ethanol, aqueous alcohol, aqueous tetrahydrofuran, dimethylformamide, dimethylsulfoxide, and aqueous mixtures of the latter, are suitable solvents for this reaction. Alkalis such as sodium or potassium hydroxide are generally employed to render the medium alkaline, and the reaction is generally carried out at a temperature from about 20°–100° C. It is preferred, however, to carry out the reaction at a temperature between 50°–75°C. The reaction time may vary from 10 minutes to several hours; generally, one hour is sufficient for complete dehalogenation, but the reaction is generally carried out until completion, as determined by NMR spectroscopy. At least one-half equivalent of the dehalogenating agent is required; however, an excess, preferably 1–10 equivalents, is usually employed. Since the reaction generally proceeds with inversion, the starting material is generally in the trans- configuration, and may be either the (±)- or D- form. Where the D-form is employed, the product is isolated in the optically active L(−) form.

It has also been found that (±) (cis-1,2-epoxypropyl)-phosphonic acid can be prepared by dehalogenation of a (±)trans- or D-trans- 2-halo-1,2-epoxypropylphosphonic acid chloride such as, for example, 2-chloro-(±) (trans-1,2-epoxypropyl)-phosphonic tetrachloride and 2-chloro-(±)-(trans-1,2-epoxypropyl)-phosphonic dichloride. The halogen is removed by treating the halo epoxypropylphosphonic acid dichloride or tetrachloride with sodium borohydride in an aqueous alkaline solution. The aqueous dehalogenation also serves to hydrolyze the chloro groups on phosphorus to the acid. Any suitable alkali, such as sodium hydroxide or potassium hydroxide, may be employed. During the course of the reaction, additional alkali is generally added where needed so as to maintain the pH between 8 and 9. The reaction is generally carried out at temperatures from about room temperature to about 50°C., and the acid is generally isolated as a salt such as the bis-ethylamine sale by addition of the desired cation or amine to the reaction mixture. The dehalogenation proceeds with inversion such that where the starting material has a 2-halo-(±)-trans- or 2-halo-D-trans- configuration, the dehalogenated product obtained has the (±)cis- or L-cis- configuration.

Where dehalogenation is effected by the use of a metal hydride such as lithium aluminum hydride, lithium tributoxy hydride, lithium trimethoxy aluminum hydride, and a lithium aluminum hydride-pyridine mixture, a mixture of the 2-halo epoxide compound and the hydride are reacted in a suitable solvent, generally at temperatures ranging from −40° to 100°C. The preferred temperature range for this reaction, however, is from about 0°C. to the reflux temperature of diethyl ether. Suitable solvents are aprotic solvents such as diethyl ether, dioxane, tetrahydrofuran, and diglyme. Generally, a reaction time of 30 minutes to 10 hours is required. About 1–4 hours, however, is generally sufficient to effect complete dehalogenation, as indicated by NMR spectroscopy. Stoichiometric amounts of the reactants are employed. Any excess of the hydride tends to decompose the epoxide. The dehalogenation proceeds with inversion, thus where the starting compound has a (±)-2-halo-(trans- ) or 2-halo-D-(trans- ) configuration, the (±) (cis- ) or L(−)(cis- ) compound is obtained.

Where a borane, such as t-butylamine borane, trimethylamine borane, dimethylamine borane, or pyridineborane is employed as the dehalogenating agent, dehalogenation is effected by stirring a mixture of the halo epoxide with the dehalogenating agent in a suitable anhydrous solvent. Anhydrous aprotic solvents such as diethyl ether, dioxane, tetrahydrofuran, and diglyme are suitable solvents for this reaction. The reaction may be carried out at temperatures ranging from −40°–100°C. It is preferred, however, to carry out the reaction at 25°–60°C. Dehalogenation may be effected in a few minutes, but in some instances it may take several hours to complete the reaction. One hour is generally sufficient, but the reaction is generally allowed to proceed until dehalogenation is complete, as indicated by NMR spectroscopy. Generally, stoichiometric amounts of the reactants are employed so as to avoid any reduction of the epoxide. Since dehalogenation with a borane proceeds with inversion, where the starting compound has the (±)-2-halo-(trans- ) or D-2-halo-(trans- ) configuration, the dehalogenated product will have a (±) or L-(cis- ) configuration.

Dehalogenation may also be effected by electrolysis of a solution of the halo epoxide. In general, the reaction is carried out by reducing the 2-halo compound in the cathode chamber of an electrolytic cell. The catholyte, that is, the solvent in the cathode chamber, may be water or a partly aqueous solution such as alcohol, or acetonitrile, containing from about 5–10 percent water. An aqueous catholyte is preferred, however. It is also preferred to use a salt in addition to the compound being reduced. Where the catholyte is water, alkali chlorides, such as sodium chloride and potassium chloride, and alkali sulfates such as potassium sulfate and lithium sulfate, may be employed. Where the catholyte is an aqueous alcohol, salts such as tetraethylammonium bromide, ammonium nitrate, lithium chloride, ammonium chloride, and the like may be used. The function of the salt in each case is to make the catholyte electrolytically conducting. In addition, the catholyte may also contain a buffer in order to control the pH. The pH of the catholyte may be between 4 and 12. A pH of 4–7, however, is preferred. Cathodes having a low overpotential, such as nickel or platinum, or those having a high overpotential, such as lead, mercury, tin and zinc, may be employed. Cathodes having a high overpotential are preferred for this reduction. A porous membrane is used to separate the cathode and anode chambers. Sintered glass is a suitable material for such a membrane. In the anode chamber, it is preferred to use dilute aqueous sulfuric acid as the anolyte, and a platinum anode. Other anodic materials, such as graphite, may be employed however. The The temperature of the system is controlled through the use of a cooling bath. While dehalogenation can be carried out at constant current density, it is preferred to use a constant cathode potential with an external reference (calomel) electrode, and a potential controller. The reaction may be carried out at a temperature between about 0°C. and the reflux temperature of the solvent, but it is preferred to carry out the electrolysis at temperatures of about 25°–50°C. Generally, the reaction is allowed to proceed until the required number of Faradays have been consumed. Electrolytic dehalogenation generally proceeds with retention of configuration, that is, where a (±)cis-2-halo- or L-cis-2-halo starting material is employed, the dehalogenated product will have the (±)cis- or L-cis- configuration.

Also contemplated as being within the scope of the present invention are 1,2-epoxypropylphosphonic acid compounds having a halo substituent on carbons 2 and 3 such as, for example, dibenzyl 2,3-dibromo-(cis-1,2-epoxypropyl)-phosphonate. In general, dehalogenation of such compounds can be carried out by any of the methods described above where dehalogenation is effected through the of a reducing agent or under hydrogenolytic conditions. The dihalo compounds can be prepared by reacting a propadienyl phosphonic acid compound such as, for example, dibenzyl 1,2-propadienyl-phosphonate with bromine or chlorine in a suitable solvent, such as carbon tetrachloride. The halogen adds across the terminal bond of the propadienylphosphonate to form a dihalo substituted propenylphosphonic acid compound such as, for example, dibenzyl 2,3-dibromopropenylphosphonate. The 2,3-dihalo-1,2-epoxypropylphosphonic acid compound is then prepared by epoxidizing the 2,3-dihalopropenylphosphonic acid compound with a suitable epoxidizing agent such as, for example, perbenzoic acid.

The 2-halo substituted 1,2-epoxypropylphosphonic acid compounds which are the starting materials for the present invention are in general prepared by the addition of halogen to a propenylphosphonic acid compound with subsequent epoxidation of the halopropenylphosphonic acid derivative. The halo-substituted olefin used to prepare the epoxypropylphosphonic acid is desigated (E) or (Z) according to whether the substituent atoms of higher atomic number, in this case the halogen and phosphorus, are on the opposite (E) or the same (Z) side of the double bond. The epoxypropylphosphonic acid compounds are referred to as cis- or trans- according to whether the terminal groups of the propylphosphonic acid radical are on the same (cis-) or opposite (trans-) side of the oxide ring. A compound is referred to an "L" if the second carbon atom in the product or in an intermediate in which halogen replaced hydrogen on carbon 2 has the configuration of L-glyceraldehyde.

Where the substituent in the 2- position is bromine or chlorine, the D-2-halo-(trans-1,2-epoxypropyl)-phosphonic acid compounds can be prepared by first reacting cis-propenylphosphonic acid with bromine or chlorine in a suitable solvent, such as chloroform or carbon tetrachloride. The (Z)-2-halopropenylphosphonic acid compound thus formed is then converted to the (±)-2-halo-(trans-1,2-epoxypropyl)-phosphonic acid compound by epoxidation with a suitable epoxidizing agent such as hydrogen peroxide. In like manner, the (±)-2-halo-(cis-1,2-eopxypropyl)-phosphonic acid compound can be prepared by reacting trans-propenylphosphonic acid with bromine or chlorine and epoxidizing the (E)-2-halo-1,2-epoxypropenylphosphonic acid intermediate. Resolution of the (±)-2-halo-(trans-1,2-epoxypropyl)- phosphonic acid intermediate with a suitable resolving agent such as (+) or (−) α-phenyethylamine will yield the D-trans-2-halo- isomer. Resolution of the (±) (cis- ) racemate will yield the L-cis-2-halo- isomer.

Where the halo substituent is iodo, the iodo compounds can be prepared by replacing the halo substituent in, for example, (±)-2-chloro-(trans-1,2-epoxypropyl)-phosphonic acid. The replacement is effected by reacting the chloro compound with sodium iodide. The replacement reaction proceeds with inversion; thus, where the starting chloro compound has the (±) (cis- ) configuration, the iodo compound obtained will have the (±) (trans- ) configuration. Likewise, where the starting chloro compound has the (±) (trans- ) configuration, the iodo compound will have the (±) (cis- ) configuration. Resolution of these racemates yields the D-trans- and L-cis-isomers, respectively.

Those compounds where the halo substituent is fluoro can be prepared by metathesis of the corresponding 2-bromo compounds employing salts such as silver fluoride or cesium fluoride.

Cis-propenylphosphonic acid can be prepared by catalytic hydrogenation of propynylphosphonic acid or an ester of propynylphosphonic acid such as, for example, di-n-butylpropynylphosphonate. Raney nickel and palladium are suitable catalysts for the reduction. Where a propynyl ester is employed, the propenyl ester is obtained by ester cleavage of the propenyl ester intermediate. Trans-propenylphosphonic acid can be prepared by reacting triethylphosphite with, for example, 1,2-dibromopropane. The trans-dialkyl propenylphosphonate formed, for example, diethyl propenylphosphonate, is then hydrolyzed by conventional means to form the free acid.

The salts of the 2-halo-1,2-epoxypropylphosphonic acids can be prepared by treating the acid with an appropriate base such as sodium hydroxide or dibenzylamine. Generally, the salts can be freely interconverted at will by passage of an aqueous or aqueous alcoholic solution through a Dowex 50 column on the cycle of the desired salt, or by metathesis where appropriate.

Where the starting material is a 2-halo substituted phosphonic acid ester, the esters can be prepared by first reacting a halo-substituted propenylphosphonic acid having either the (E) or (Z) configuration with phosphorus pentachloride or phosphorus pentabromide to form the corresponding 2-halo substituted propenylphosphonic dichloride or dibromide. The ester group is then introduced by reacting the propenylphosphonic dihalide with an appropriate alcohol, such as benzyl alcohol, allyl alcohol, propargyl alcohol, p-nitrobenzyl alcohol or phenol in the presence of an amine, such as triethylamine, in a suitable solvent, such as benzene or toluene. The 2-halo substituted propenylphosphonic acid ester is then epoxidized by reaction with a suitable epoxidizing agent, such as monoperphthalic acid. Where the olefin having the (Z)-configuration is employed, the trans-oxide is obtained. Where a mono- ester is desired, treatment of the diester with sodium hydroxide hydrolyzes one of the ester groups. In all cases, the racemic mixture obtained may be resolved through the use of a suitable resolving agent, such as (±) or (−) α-phenethylamine. To prepare esters where the halo substituent at the 2- position is iodo, a 2- substituted chloro or bromo (cis-1,2-epoxypropyl)-phosphonic acid ester such as, for example, dibenzyl (±)-2-chloro-(trans-1,2-epoxypropyl)-phosphonate, is reacted with sodium iodide with inversion to yield a 2-iodo compound such as, for example, dibenzyl (±)-2-iodo-(cis-1,2-epoxypropyl)-phosphonate.

The 2-halo-1,2-epoxypropylphosphonic tetrahalide compounds can be prepared by first reacting acetylene with an equivalent of phosphorus pentachloride or phosphorus pentabromide to form a 2-halopropenylphosphonic tetrahalide such as, for example, 2-chloro-propenylphosphonic tetrachloride. The 2-halo-1,2-epoxypropylphosphonic tetrahalide compounds are formed by treating the 2-halopropenylphosphonic tetrahalide with a suitable epoxidizing agent such as, for example, monoperphthalic acid.

(±) and (−) (cis-1,2-epoxypropyl)-phosphonic acid and its salts are useful antimicrobial agents, which are active in inhibiting the growth of both gram-positive and gram-negative pathogenic bacteria. The (−) form, and particularly its salts, are active against *Bacillus, Escherichia, Staphylocci, Salmonella* and *Proteus pathogens*, and antibiotic-resistant strains thereof. Illustrative of such pathogens are *Bacillus subtilis, Escherichia coli, Salmonella schottmuelleri, Salmonella gallinarum, Salmonella pullorum, Proteus vulgaris, Proteus mirabilis, Proteus morganii, Staphylococcus aureus* and *Staphylococcus pyogenes*. Thus, (±) and (−) (cis-1,2-epoxypropyl)-phosphonic acid and salts thereof can be used as antiseptic agents to remove susceptible organisms from pharmaceutical, dental and medical equipment and other areas subject to infection by such organisms. Similarly, they can be used to separate certain microorganisms from mixtures of microorganisms. Salts of (−) (cis-1,2-epoxypropyl)-phosphonic acid such as the sodium and calcium salts are also useful in the treatment of diseases caused by bacterial infections in man and animals and are particularly valuable in this respect, since they are active against strains of pathogens resistant toward other antimicrobial agents. These salts are especially valuable, since they are effective when given orally, although they can also be administered parenterally. The salts of (±) (cis-1,2-epoxypropyl)-phosphonic acid are useful as preservatives in industrial applications since they effectively inhibit undesirable bacterial growth in the white water used in paper mills and in paints, e.g. in polyvinyl acetate latex paint.

The following examples are given for purposes of illustration and not by way of limitation.

Example 1

DEHALOGENATION OF (±)-2-CHLORO-(CIS-1,2-EPOXYPROPYL)-PHOSPHONIC ACID MONOBENZYLAMMONIUM SALT WITH HYDROGEN (±)-2-chloro-(cis-1,2-epoxypropyl)-phosphonic acid monobenzylammonium salt (28.0 grams, 0.1 mole) is dissolved in 200 ml. of methanol, and to the resulting solution is added 4.0 grams of flake sodium hydroxide. The resulting mixture is then stirred until the sodium hydroxide is complete dissolved, and the solution is then shaken with 5 percent palladized carbon (1 gram) under 10 p.s.i.g. of hydrogen until 0.1 mole of hydrogen is consumed. The catalyst and sodium chloride are removed by filtration, and the filtrate is evaporated to dryness. Upon crystallization of the residue from ethanol, (±) (cis-1,2-epoxypropyl)-phosphonic acid monobenzylammonium salt, m.p. 155°–157°C., is obtained.

Example 2

DEHALOGENATION OF L-2-BROMO-(CIS-1,2-EPOXYPROPYL)-PHOSPHONIC ACID MONO(+)α-PHENETHYLAMMONIUM SALT WITH HYDROGEN

L-2-bromo-(cis-1,2-epoxypropyl)-phosphonic acid mono(+)α-phenethylammonium salt (33.8 grams, 0.1 mole) is dissolved in 200 ml. of methanol, and to the resulting solution is added 4.0 grams of flake sodium hydroxide. The mixture is stirred until the sodium hydroxide is completely dissolved, and the solution is then shaken with 1 teaspoon of Raney nickel under 10 p.s.i.g. of hydrogen until 0.1 mole of hydrogen is absorbed. The catalyst and sodium bromide are removed by filtration, and the filtrate is evaporated to dryness. Upon crystallization of the residue from ethanol, L(−) (cis-1,2-epoxypropyl)-phosphonic acid mono(+)α-phenethyl-ammonium salt, m.p. 137°–140°C., is obtained.

Example 3

DEHALOGENATION OF (±)-2-CHLORO-(CIS-1,2-EPOXYPROPYL)-PHOSPHONIC ACID DIBENZYLAMMONIUM SALT WITH LITHIUM

To a slurry of (±)-2-chloro-(cis-1,2-epoxypropyl)-phosphonic acid dibenzylammonium salt (20.0 grams) in 300 ml. of tetrahydrofuran is added lithium ribbon (2.0 grams) in small pieces under an atmosphere of argon while maintaining the reaction mixture at a temperature of 25°C. To the resulting mixture is added dropwise a solution of 15 grams of t-butanol in 50 ml. of tetrahydrofuran while maintaining the temperature of the mixture at 20°–30°C. After the addition is complete, 100 ml. of water is cautiously added, and the mixture is evaporated in vacuo to remove the tetrahydrofuran. The pH of the aqueous solution is adjusted to 9.0 by the addition of 10 percent acetic acid. A solution of 10 grams of calcium acetate in 50 ml. of water is added with stirring, and (±) (cis-1,2-epoxypropyl)-phosphonic acid calcium salt precipitates out of solution. The salt is collected by filtration, washed with water, and is dried in vacuo at 60°C. The product is crystallized from water to yield a compound having a decomposition point greater than 250°C.

Example 4

DEHALOGENATION OF (±)-2-IODO-(CIS-1,2-EPOXYPROPYL)-PHOSPHONIC ACID DISODIUM SALT WITH THIOPHENOL

To a solution of (±)-2-iodo-(cis-1,2-epoxypropyl)-phosphonic acid disodium salt (30.8 grams) in 300 ml. of 50 percent aqueous methanol under nitrogen is added 22 grams of thiophenol. The resulting solution is stirred for 2 hours, and is then evaporated to one-half its volume in vacuo. The aqueous mixture is then filtered, and the filtrate is washed with 3 × 50 ml. of chloroform. The aqueous solution is then diluted with 100 ml. of water and is passed through a column of Dowex 50 on the acid cycle at 0°–5°C. The eluate is neutralized to pH 8.5 with aqueous ethylamine and is then evaporated to dryness. Upon crystallization of the residue from ethanol, (±) (cis-1,2-epoxypropyl)-phosphonic acid bis-ethylamine salt, m.p. 154°–156°C., is obtained.

Example 5

DEHALOGENATION OF L-2-CHLORO-(CIS-1,2-EPOXYPROPYL)-PHOSPHONIC ACID DI(±)AMPHETAMMONIUM SALT WITH ZINC DUST

L-2-chloro-(cis-1,2-epoxypropyl)-phosphonic acid di(±)amphetammonium salt (22.15 grams, 0.05 mole) is dissolved in 150 ml. of hot ethanol. The resulting hot ethanolic solution is then treated with 15 grams of zinc dust with vigorous stirring, and the mixture is heated at 70°C. for 2 hours. The mixture is filtered while hot, the zinc filter cake is washed with 2 × 50 ml. of hot ethanol, and the combined filtrate and washings are concentrated in vacuo until a thick slurry is obtained. The crude product is filtered off and upon recrystallization from ethanol, L(−) (cis-1,2-epoxypropyl)-phosphonic acid mono(+)amphetammonium salt, m.p. 163°–165°C., is obtained.

Example 6

DEHALOGENATION OF L-2-BROMO-(CIS-1,2-EPOXYPROPYL)-PHOSPHONIC ACID-(+)α-PHENETHYLAMMONIUM SALT WITH ALUMINUM AMALGAM

L-2-bromo-(cis-1,2-epoxypropyl)-phosphonic acid (+)α-phenethylammonium salt (22.9 grams) is dissolved in 150 ml. of hot ethanol, and the resulting solution is treated with 10 grams of amalgamated aluminum foil. The resulting mixture is heated at 70°C. with vigorous stirring for 2 hours. The mixture is then filtered while hot, the aluminum foil cake is washed with 2 × 50 ml. of hot ethanol, and the combined filtrate and washings are concentrated in vacuo until a thick slurry is obtained. The crude salt is filtered off, and upon recrystallization from ethanol, L(-) (cis-1,2-epoxypropyl)-phosphonic acid mono(+)α-phenethylammonium salt, m.p. 137°–140°C., is obtained.

Example 7

DEHALOGENATION OF (±)-2-IODO-(CIS-1,2-EPOXYPROPYL)-PHOSPHONIC ACID DISODIUM SALT WITH COPPER-ASCORBIC ACID (±)-2-iodo-(cis-1,2-epoxypropyl)-phosphonic acid disodium salt (30.8 grams, 0.1 mole) is dissolved in 150 ml. of water, and to the resulting solution is added 15 grams of copper-bronze powder and a solution of 35 grams of ascorbic acid in 100 ml. of 2 N sodium hydroxide. The reaction mixture is stirred vigorously and is heated under reflux for 2 hours in an atmosphere of nitrogen. 2 N sodium hydroxide is added to the reaction mixture as required to maintain a pH of 8.0. The reaction mixture is then cooled to 25°C., filtered, treated with 50 ml. of 2 N benzylammonium bisulfate, and evaporated to dryness in vacuo below 20°C. The residue is triturated with 250 ml. of methanol at 40°C., filtered, and the filtrate evaporated to dryness. Upon recrystallization of the residue from ethanol, (±) (cis-1,2-epoxypropyl)-phosphonic acid monobenzylammonium salt, m.p. 169°–171°C., is obtained.

Example 8

DEHALOGENATION OF (±)-2-CHLORO-(TRANS-1,2-EPOXYPROPYL)-PHOSPHONIC ACID DISODIUM SALT WITH SODIUM BOROHYDRIDE (±)-2-chloro-(trans-1,2-epoxypropyl)-phosphonic acid disodium salt (21.7 grams, 0.1 mole) is dissolved in 100 ml. of water, and to the resulting solution are added 25 grams of sodium borohydride and 50 ml. of 2 N sodium hydroxide. The reaction mixture is stirred at 50°C. for one hour, cooled to 20°C., filtered, and the filtrate is treated with 50 ml. of 2 M ethylamine sulfate. The aqueous solution is evaporated to dryness in vacuo, the residue is triturated with 150 ml. of warm methanol, and the methanol extract is evaporated to dryness. Upon crystallization of the residue from ethanol, (±) (cis-1,2-epoxypropyl)-phosphonic acid bis-ethylamine salt, m.p. 153°–156°C., is obtained.

Example 9

DEHALOGENATION OF (±)-2-BROMO-(TRANS-1,2EPOXYPROPYL)-PHOSPHONIC ACID DIBENZYLAMINE SALT WITH LITHIUM ALUMINUM HYDRIDE (±)-2-bromo-(trans-1,2-epoxypropyl)-phosphonic acid dibenzylamine salt (43.1 grams, 0.1 mole) and 2.85 grams of lithium aluminum hydride are placed in 250 ml. of ethyl ether, and the mixture is heated under reflux for 3 hours. 150 ml. of water is added cautiously with continued stirring, after which 2 N sulfuric acid is added until a pH of 8.5 is reached. The ethereal layer is discarded, and the aqueous layer is evaporated to dryness in vacuo. The residue is triturated with 200 ml. of warm methanol for 2 hours, after which the slurry is filtered, and the filtrate evaporated to dryness. Upon recrystallization of the residue from ethanol, (±) (cis-1,2-epoxypropyl)-phosphonic acid dibenzylammonium salt is obtained.

Example 10

DEHAOLGENATION OF (±)2-IODO-(TRANS-1,2-EPOXYPROPYL)-PHOSPHONIC ACID BIS-ETHYLAMMONIUM SALT WITH ETHYLAMINE BORANE (±)-2-iodo-(trans-1,2-epoxypropyl)-phosphonic acid bis-ethylammonium salt (32.3 grams, 0.1 mole) is suspended in 200 ml. of anhydrous ethyl ether, and to the suspension is added 5.9 grams of ethylamine borane. The resulting mixture is stirred for 2 hours, after which 150 ml. of water is cautiously added. The ether layer is discarded, and the aqueous layer is evaporated to dryness. Upon recrystallization of the residue from ethanol, (±) (cis-1,2-epoxypropyl)-phosphonic acid bis-ethylammonium salt, m.p. 153°–156°C., is obtained.

Example 11

ELECTROLYTIC DEHALOGENATION OF (±)-2-BROMO-(CIS-1,2-EPOXYPROPYL)-PHOSPHONIC ACID DISODIUM SALT

An electrolytic cell is assembled with an anodic compartment comprising 1 N aqueous sodium sulfate and Pt gauze anode, separated by a large fritted glass disk from the cathodic compartment. The cathode, comprising sheet lead with a surface area of 325 square centimeters, is immersed in a stirred catholyte consisting of 400 ml. of 1 N aqueous sodium chloride. (±)-2-bromo-(cis-1,2-epoxypropyl)-phosphonic acid disodium salt (23 grams, 0.1 mole) is dissolved in the catholyte and dilute aqueous hydrochloric acid is added to lower the pH to 6.0. The temperature of the catholyte is maintained at 25°C. with external cooling. A potential of 9.0 volts is applied and maintained at the cathode. The pH is maintained at 6.0 ± 0.2 by addition of 2 N sodium hydroxide as required. After a total of 5.30 ampere-hours, the reduction is stopped, procaine bisulfate (0.1 mole) is added, and the catholyte solution is evaporated to dryness in vacuo. The residue is triturated with 160 ml. of warm methanol, and the methanol extract is evaporated to dryness. Upon crystallization of the residue from ethanol, (±) (cis-1,2-epoxypropyl)-phosphonic acid monoprocaine salt, m.p. 127°–130°C., is obtained.

Example 12

DEHALOGENATION OF (±)-2-CHLORO-(TRANS-1,2-EPOXYPROPYL)-PHOSPHONIC TETRACHLORIDE WITH SODIUM BOROHYDRIDE

Sodium borohydride (25 grams) is suspended in 100 ml. of 2 N sodium hydroxide. The temperature of the resulting mixture is maintained at 50° C. with vigorous stirring. To the mixture is added in portions (±)-2-chloro-(trans-1,2-epoxypropyl)-phosphonic tetrachloride (0.1 mole). Additional 50 percent sodium hydroxide is added as required to maintain a pH of 8–9. After the addition is complete the reaction mixture is stirred for 10 minutes, cooled to 20°C., and treated with 50 ml. of 2 M ethylamine sulfate. The resulting mixture is evaporated to dryness, and the residue is triturated with 150 ml. of warm methanol. The methanol extract is evaporated to dryness, and upon crystallization of the residue from ethanol, (±) (cis-1,2-epoxypropyl)-phosphonic acid bis-ethylamine salt, m.p. 153°–156°C., is obtained.

Example 13

DEHALOGENATION OF (±)-2-CHLORO-(TRANS-1,2-EPOXYPROPYL)-PHOSPHONIC ACID DICHLORIDE WITH SODIUM BOROHYDRIDE

Sodium borohydride (25 grams) is suspended in 100 ml. of 2 N sodium hydroxide. The temperature of the resulting mixture is maintained at 50°C. with vigorous stirring. To the mixture is added in portions (±)-2-chloro-(trans-1,2-epoxypropyl)-phosphonic tetrachloride (0.1 mole). Additional 50 percent sodium hydroxide is added as required to maintain a pH of 8–9. After the addition is complete, the reaction mixture is stirred for 10 minutes, cooled to 20°C., and treated with 50 ml. of 2 M ethylamine sulfate. The resulting mixture is evaporated to dryness, and the residue is triturated with 150 ml. of warm methanol. The methanol extract is evaporated to dryness, and upon crystallization of the residue from ethanol, (±) (cis-1,2-epoxypropyl)-phosphonic acid bis-ethylamine salt, m.p. 153°–156°C., is obtained.

Example 14

DEHALOGENATION OF DISODIUM-(±)-2-CHLORO-(CIS-1,2-EPOXYPROPYL)-PHOSPHONATE WITH ZINC-ACETIC ACID

Disodium(±)-2-chloro-(cis-1,2-epoxypropyl)-phosphonate (0.1 mole) is dissolved in 300 ml. of glacial acetic acid at 25°C. To the resulting solution is added slowly 0.5 moles of zinc dust. The reaction mixture is stirred at 25°C. for 4 hours, after which it is filtered. Benzylammonium bisulfate (0.1 mole) is added, and the resulting mixture is evaporated to dryness in vacuo. The residue is triturated with 150 ml. of methanol for one hour, and then filtered. The filtrate is evaporated to dryness in vacuo, and upon crystallization of the residue from ethanol, (±) (cis-1,2-epoxypropyl)-phosphonic acid monobenzylammonium salt, m.p. 155°–157°C., is obtained.

Example 15

CATALYTIC DEHALOGENATION OF DIBENZYL(±)-2-CHLORO-(CIS-1,2-EPOXYPROPYL)-PHOSPHONATE

Dibenzyl(±)-2-chloro-(cis-1,2-epoxypropyl)-phosphonate (0.05 mole) is dissolved in 100 ml. of benzene containing 0.15 mole) of triethylamine. To the resulting solution is added 1 gram of 5 percent Pd-carbon, and the mixture is shaken under 15 p.s.i.g. of hydrogen until 0.15 moles of hydrogen have been absorbed. The catalyst and triethylamine hydrochloride are removed by filtration, and the filtrate is concentrated in vacuo. Upon recrystallization of the residue from ethanol, (±) (cis-1,2-epoxypropyl)-phosphonate bis-triethylammonium salt is obtained.

Example 16

DEHALOGENATION OF ALLYL L-2-BROMO-(CIS-1,2-EPOXYPROPYL)-PHOSPHONATE(+)α-PHENETHYLAMMONIUM SALT WITH RANEY NICKEL

Allyl L-2-bromo-(cis-1,2-epoxypropyl)-phosphonate (+)α-phenethylammonium salt (0.05 moles) is dissolved in 100 ml. of benzene containing 0.10 moles of pyridine. To the resulting solution is added two teaspoons of Raney nickel, and the mixture is shaken under 15 p.s.i.g. of hydrogen until 0.10 moles of hydrogen have been absorbed. The catalyst and pyridine hydrochloride are removed by filtration, and the filtrate is evaporated to dryness in vacuo. Upon crystallization of the residue from ethanol, L-(cis-1,2-epoxypropyl)-phosphonate mono(±)α-phenethylammonium salt is obtained.

Example 17

DEHALOGENATION OF DI(p-CHLOROBENZYL) (±)-2-CHLORO-(CIS-1,2-EPOXYPROPYL)-PHOSPHONATE WITH LITHIUTM

Di(p-chlorobenzyl) (±)-2-chloro-(cis-1,2-epoxypropyl)-phosphonate (0.05 mole) is dissolved in 300 ml. of tetrahydrofuran. Lithium wire (0.3 mole) is added to the resulting solution in small pieces under an atmosphere or argon while maintaining the temperature of the reaction mixture at 25°C., and a solution of t-butanol (0.2 mole) in 50 ml. of tetrahydrofuran is added dropwise. After the addition is complete, 100 ml. of water is added cautiously, the mixture is evaporated in vacuo to remove tetrahydrofuran, and the aqueous solution is washed with 3 × 50 ml. of methylene chloride. A solution of calcium acetate (0.05 mole) in 150 ml. of water is added, and the precipitate of calcium-(±) (cis-1,2-epoxypropyl)-phosphonate is filtered off, washed with water, and vacuum dried at 50°C.

Example 18

DEHALOGENATION OF DIALLYL-(±)-2-IODO-(CIS-1,2-EPOXYPROPYL)-PHOSPHONATE WITH ZINC

Diallyl-(±)-2-iodo-(cis-1,2-epoxypropyl)-phosphonate (0.05 mole) is dissolved in 150 ml. of hot ethanol, and the resulting solution is treated with amalgamated zinc turnings (20 grams) with vigorous stirring. The mixture is heated at 70°C. with stirring for 3 hours, after which it is cooled to 25°C., ethylamine sulfate (0.05 mole) is added, and the mixture is stirred an additional 2 hours. The mixture is then filtered, and the filtrate is evaporated to dryness. Upon crystallization of the residue from ethanol, (±) (cis-1,2-epoxypropyl)-phosphonic acid bis-ethylammonium salt, m.p. 154°–156°C., is obtained.

Example 19

DEHALOGENATION OF o-PHENYLENYL-(±)-2-BROMO-(CIS-1,2-EPOXYPROPYL)-PHOSPHONATE WITH MAGNESIUM COPPER COUPLE o-phenylenyl-(±)-2-bromo-(cis-1,2-epoxypropyl)-phosphonate (0.05 mole) is dissolved in 150 ml. of methanol, and the methanol solution is heated to 50°C. Magnesium copper couple (20 grams) is added to the warm solution with vigorous stirring. The mixture is heated at 50°C. for 4 hours with stirring, after which it is cooled to 25°C. and treated with benzylammonium sulfate (0.05 mole). The mixture is then stirred for an additional 3 hours, after which he undissolved material is removed by filtration. The filtrate is concentrated to the point of crystallization. The crystals are collected by filtration, and upon recrystallization from ethanol, (±) (cis-1,2-epoxypropyl)-phosphonic acid dibenzylammonium salt is obtained.

Example 20

CATALYTIC DEHALOGENATION OF DIBENZYL-(±)-2,3-DIBROMO-(CIS-1,2-EPOXYPROPYL)-PHOSPHONATE

Dibenzyl-(±)-2,3-dibromo-(cis-1,2-epoxypropyl)-phosphonate (0.05 mole) is dissolved in 100 ml. of benzene containing 0.20 mole of triethylamine. To the resulting solution is added 1 gram of 5 percent Pd-carbon, and the mixture is shaken under 15 p.s.i.g. of hydrogen until 0.20 moles of hydrogen have been absorbed. The catalyst and triethylamine hydrobromide are removed by filtration, and the filtrate is concentrated in vacuo. Upon crystallization of the residue from ethanol, (±) (cis-1,2-epoxypropyl)-phosphonic acid bis-triethylammonium salt is obtained.

The following examples illustrate a method by which the compounds used as starting materials can be prepared.

Example 21

DIBENZYL-(±)-2,3-DIBROMO-(CIS-1,2-EPOXYPROPYL)-PHOSPHONATE

Bromine (0.4 mole) is added dropwise to a solution of dibenzyl-1,2-propadienylphosphonate (0.2 mole) in 100 ml. of carbon tetrachloride. After the addition is complete, the resulting solution is washed with aqueous sodium bicarbonate and dried over magnesium sulfate. Upon evaporation of the solvent, dibenzyl-(E)-2,3-dibromopropenyl-phosphonate is obtained as an oil. The oil is dissolved in 100 ml. of benzene and the solution is chilled to 5°–10°C. Perbenzoic acid (0.2 mole) in 100 ml. of cold benzene is added to the resulting solution, and the reaction mixture is stirred in the cold until a sample no longer gives a positive starch potassium iodide test. The mixture is then extracted with aqueous sodium bicarbonate, and the extract is dried over sodium sulfate. Upon evaporation of the filtrate to dryness, dibenzyl-(±)-2,3-dibromo-(cis-1,2-epoxypropyl)-phosphonate is obtained.

Example 22

CIS-PROPENYL-1-PHOSPHONIC ACID

Di-n-butyl-cis-propenylphosphonate (9.7 grams) is refluxed in 80 ml. of concentrated hydrochloric acid (12.4 N) for 15 hours in an oil bath maintained at 108°–117°C. The reaction mixture is allowed to cool to room temperature, after which the solution is concentrated in vacuo with heating. Water (50 ml.) is added to the residue, and the evaporation process is repeated yielding 6.19 grams of a brown viscous residue. The residue is dissolved in 25 ml. of ethyl ether, and the ether solution is extracted with 3 × 10 ml. of water. Evaporation of the ether layer yields 2.56 grams of a brown residue. Evaporation of the aqueous extracts in vacuo yields 3.43 grams of a pale yellow oil. The residue obtained from the aqueous extract is purified by dissolving it in 25 ml. of ether, and extracting the ether solution with 12 ml. of water. Evaporation of the aqueous extract in vacuo with heating yields cis-propenyl-1-phosphonic acid, a pale yellow viscous oil. Infrared spectra of the yellow oil shows the characteristic olefinic band at $6.1\mu$.

Example 23

(Z)-2-BROMO-PROPENYLPHOSPHONIC ACID cis-propenylphosphonic acid (12.2 grams, 0.1 mole) is dissolved in 100 ml. of chloroform, and to this solution is added dropwise a solution of bromine (16.0 grams, 0.1 mole) in 16 ml. of carbon tetrachloride under illumination with a 1,000-watt projection bulb. After the color of the bromine is discharged, the solution is evaporated to dryness, and the residue is heated in an oil bath at 190°C. under aspirator vacuum. After the evolution of hydrogen bromide ceases, the residue is crystallized from a chloroformcarbon tetrachloride mixture. Upon recrystallization, (Z)-2-bromo-propenylphosphonic acid is obtained.

When in the above procedure trans-propenylphosphonic acid is employed in place of cis-propenylphosphonic acid, the isomeric (E)-2-bromopropenylphosphonic acid is obtained.

Example 24

(Z)-2-CHLORO-PROPENYLPHOSPHONIC ACID cis-propenylphosphonic acid (12.2 grams, 0.1 mole) is dissolved in 100 ml. of chloroform, and to the resulting solution is added dropwise a previously prepared solution of chlorine (7.1 grams) in 100 ml. of carbon tetrachloride under illumination of a 1,000-watt projection bulb. After the addition of chlorine is complete as evidenced by the discharge of the yellow color, the solution is evaporated to dryness in vacuo while being heated by an external oil bath until the evolution of hydrogen chloride gas has ceased. Upon crystallization of the residue from chloroform-carbon tetrachloride, (Z)-2-chloro-propenylphosphonic acid is obtained.

Example 25

(−)-2-BROMO-(CIS-1,2-EPOXYPROPYL)-PHOSPHONIC ACID-BIS-(+)-α-PHENETHYLAMMONIUM SALT a. To a 2-liter, 3-necked flask equipped with stirrer, thermometer, pH electrode and addition funnel is added 1.1 liters of water, (E)-2-bromo-propenylphosphonic acid (300 grams, 1.5 mole), and sodium tungstate dihydrate (6.0 grams). The pH of the mixture is adjusted to 5.0–5.5 by the addition of 20 percent sodium hydroxide. 150 ml. of 30 percent hydrogen peroxide is added during 15 minutes while maintaining the temperature of the mixture at 50°–60°C. and the pH at 4.8–5.2 by the addition of 2 N sodium hydroxide as required. The reaction mixture is then stirred for one hour at 55°C., after which it is cooled, and the remaining excess of hydrogen peroxide is destroyed by the addition of sodium hydroxide until the pH of the solution is 8.5. The resulting solution contains the disodium salt of (±)-2-bromo-(cis-1,2-epoxypropyl)-phosphonic acid.

When in the above procedure (Z)-2-bromo-propenylphosphonic acid, (E)-2-chloro-propenylphosphonic acid, and (Z)-2-chloro-propenylphosphonic acid are employed in place of (E)-2-bromo-propenylphosphonic acid, (±)-2-bromo-(trans-1,2-epoxypropyl)-phosphonic acid disodium salt, (±)-2-chloro-(cis-1,2-epoxypropyl)-phosphonic acid disodium salt, and (±)-2-chloro-(trans-1,2-epoxypropyl)-phosphonic acid disodium salt are obtained.

b. Conversion to (bis)-α-phenethylammonium salt

A jacketed column containing 200 ml. of Dowex 50 resin on the acid cycle with a circulating coolant at 0°C. is washed with water at 5°C. A solution of 0.2 moles of disodium salt of (±)-2-bromo-(cis-1,2-epoxypropyl)-phosphonic acid in 500 ml. of water is chilled to 0°–5°C. and passed over the resin at a rate of 20–40 ml. per minute. The column is washed with 2 bed columes of water at the same rate, and the effluent is collected in a flask with stirrer containing (+)α-phenethylamine (48.4 grams, 0.4 mole). The resulting solution is evaporated to dryness in vacuo, and the residue is crystallized by the addition of ethanol. Upon recrystallization from ethanol, the resolved (−)-2-bromo-(cis-1,2-epoxypropyl)-phosphonic acid bis-(+)α-phenethylammonium salt is obtained.

When in the above procedure the effluent is neutralized with 0.4 moles of benzylamine in place of 0.4 moles of (+)-α-phenethylamine, the bis-benzylammonium salt of the racemic (±)-2-bromo-(cis-1,2-epoxypropyl)-phosphonic acid is obtained.

Example 26

(±)-2-IODO-(CIS-1,2EPOXYPROPYL)-PHOSPHONIC ACID DISODIUM SALT (±)-2-chloro-(trans-1,2-epoxypropyl)-phosphonic acid dibenzylammonium salt (38.6 grams) is dissolved in 400 ml. of ethanol, and sodium iodide (15.0 grams) is added to the resulting solution. The mixture is warmed with stirring to effect solution, and the stirring is continued for 16 hours. The precipitated sodium chloride is filtered off, and the addition of sodium methoxide (10.8 grams, 0.2 mole) in ethanol precipitates the disodium salt of (±)-2-iodo-(cis-1,2-epoxypropyl)-phosphonic acid.

Example 27

(±)-2-IODO-(TRANS-1,2-EPOXYPROPYL)-PHOSPHONIC ACID DISODIUM SALT (±)-2-chloro-(cis-1,2-epoxypropyl)-phosphonic acid dibenzylammonium salt (38.6 grams) is dissolved in 400 ml. of ethanol, and to the resulting solution is added 15.0 grams of sodium iodide. The mixture is warmed with stirring to effect solution, and the stirring is continued for 16 hours. The precipitated sodium chloride is removed by filtration. The addition of sodium methoxide (10.8 grams, 0.2 mole) causes the disodium salt of (±)-2-iodo-(trans-1,2-epoxypropyl)-phosphonic acid to precipitate out of solution.

When in the above procedure the filtrate obtained after removal of sodium chloride is diluted with an equal volume of water and passed through a Dowex 50 column on the ethylammonium cycle, evaporation of the effluent to dryness and crystallization of the residue from ethanol yields (±)-2-iodo-(trans-1,2-epoxypropyl)-phosphonic acid bis-ethylammonium salt.

When in the above procedure the disodium salt is converted to the (+)amphetamine salt, recrystallization of the latter salt yields the optically active L-isomer.

Example 28

(E)-2-CHLORO-PROPENYLPHOSPHONIC DICHLORIDE

To (E)-2-chloro-propenylphosphonic acid (0.1 mole) in 100 ml. of carbon tetrachloride is added in portions 0.2 mole of phosphorus pentachloride. The thick mixture is stirred at 30°C. for 2 hours, and the solvent and phosphorus oxychloride are removed by evaporation in vacuo to yield substantially pure (E)-2-chloro-propenylphosphonic dichloride.

When in the above procedure (Z)-2-chloro-propenylphosphonic acid, (E)-2-bromo-propenylphosphonic acid, and (Z)-2-bromo-propenylphosphonic acid are employed in place of (E)-2-chloro-propenylphosphonic acid, (Z)-2-chloropropenylphosphonic dichloride, (E)-2-bromopropenylphosphonic dichloride, and (Z)-2-bromo-propenylphosphonic dichloride are obtained, respectively.

Example 29

DIBENZYL-(E)-2-CHLORO-PROPENYLPHOSPHONATE

A stirred solution of benzyl alcohol (0.2 mole) and triethylamine (0.2 mole) in 100 ml. of benzene is cooled to 5°C. To the resulting solution is added (E)-2-chloropropenylphosphonic dichloride (0.1 mole) at such a rate so as to maintain the temperature at 5°–10 °C. After the addition is complete, the mixture is stirred at 25°C. for 1 hour. The triethylamine hydrochloride is filtered off. Upon removal of the solvent from the filtrate in vacuo, dibenzyl-(E)-2-chloro-propenylphosphonate is obtained.

When in the above procedure (Z)-2-chloro-propenylphosphonic dichloride, (E)-2-bromo-propenylphosphonic dichloride, and (Z)-2-bromo-propenylphosphonic dichloride are employed in plate of (E)-2-chloro-propenylphosphonic dichloride and phenol is employed in place of benzyl alcohol, diphenyl-(Z)-2-chloro-propenylphosphonate, diphenyl-(E)-bromopropenylphosphonate and diphenyl-(Z)-2-bromo-propenylphosphonate, respectively, are obtained.

Example 30

DIBENZYL-(±)-2-CHLORO-(CIS-1,2-EPOXYPROPYL)-PHOSPHONATE

To a stirred solution of dibenzyl-(E)-2-chloropropenylphosphonate (0.1 mole) in 100 ml. of methylene chloride chilled to 0°–5°C., in an ice bath is added a cold solution of monoperphthalic acid (0.1 mole) in 100 ml. of methylene chloride. The reaction mixture is stirred in the cold until a sample no longer gives a positive starch potassium iodide test. The precipitated phthalic acid is filtered off, and the filtrate is washed with dilute aqueous sodium carbonate and dried over sodium sulfate. Upon evaporation of the filtrate to dryness, dibenzyl-(±)-2-chloro-(cis-1,2-epoxypropyl)-phosphonate is obtained.

When in the above procedure diphenyl-(E)-2-chloropropenylphosphonate, bis-allyl-(E)-2-chloropropenylphosphonate, and bis-propargyl-(E)-2-chloro-propenylphosphonate are employed in place of dibenzyl-(E)-2-chloro-propenylphosphonate, diphenyl-(±)-2-chloro-(cis-1,2-epoxypropyl)-phosphonate, bis-allyl-(±)-2-chloro-(cis-1,2-epoxypropyl)-phosphonate, and bis-propargyl-(±)-2-chloro-(cis-1,2-epoxypropyl)-phosphonate are obtained, respectively.

Example 31

DIBENZYL-(±)-2-IODO-(CIS-1,2-EPOXYPROPYL)-PHOSPHONATE

To a solution of dibenzyl-(±)-2-chloro-(trans-1,2-epoxypropyl)-phosphonate (0.1 mole) in 400 ml. of ethanol is added 15.0 grams of sodium iodide. The solution is warmed with stirring to effect solution, and the mixture is stirred overnight. The precipitated sodium chloride is filtered off, and upon evaporation of the solvent in vacuo, dibenzyl-(±)-2-iodo-(cis-1,2-epoxypropyl)-phosphonate is obtained.

When in the above procedure diphenyl-(±)-2-bromo-(cis-1,2-epoxypropyl)-phosphonate is employed in place of dibenzyl-(±)-2-chloro-(trans-1,2-epoxypropyl)-phosphonate, diphenyl-(±)-2-iodo-(trans-1,2-epoxypropyl)-phosphonate is obtained.

Example 32

BENZYL-(±)-2-CHLORO-(CIS-1,2-EPOXYPROPYL)-PHOSPHONATE SODIUM SALT

Dibenzyl-(±)-2-chloro-(cis-1,2-epoxypropyl)-phosphonate (0.1 mole) is dissolved in 200 ml. of methanol. Aqueous 25 percent sodium hydroxide (30 ml.) is added, and the mixture is warmed to 40°C. with stirring. The stirring is continued until work-up of a sample shows hydrolysis to be substantially complete. Water (150 ml.) is added, and the reaction mixture is concentrated in vacuo to a volume of 120 ml. Dowex 50 resin (on the acid cycle) is added until the pH of the mixture is 7. The aqueous layer is filtered, and one equivalent of aqueous sodium hydroxide is added to the filtrate. Upon removal of the solvent, benzyl-(±)-2-chloro-(cis-1,2-epoxypropyl)-phosphonate sodium salt is obtained.

It should be understood that although this invention has been described with reference to particular embodiments thereof, changes and modifications may be made which are within its intended scope, and it should be limited only by the language of the appended claims.

What is claimed is:

1. A compound of the formula

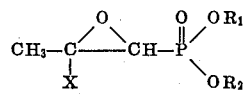

wherein X is chloro, bromo, and iodo, and $R_1$ and $R_2$ are the same or different hydrogen, phenyl, halophenyl, nitrophenyl, o-phenylene, benzyl, halobenzyl, dinitrobenzyl, $\beta$-methylbenzyl, lower alkenyl, and lower alkynyl, a cation selected from the group consisting of alkali metals and alkaline earth metals, and an ammonium ion.

2. The compound of claim 1, which compound is dibenzyl (±)-2-chloro-(cis-1,2-epoxypropyl)-phosphonate.

3. The compound of claim 1, which compound is di-allyl (±)-2-chloro-(cis-1,2-epoxypropyl)-phosphonate.

4. The compound of claim 1, which compound is (±)-2-chloro-(cis-1,2-epoxypropyl)-phosphonic acid disodium salt.

5. The compound of claim 1, which compound is (±)-2-chloro-(cis-1,2-epoxypropyl)-phosphonic acid dibenzylammonium salt.

* * * * *

UNITED STATES PATENT OFFICE
CERTIFICATE OF CORRECTION

Patent No. 3,689,508          Dated September 5, 1972

Inventor(s) Edwin F. Schoenewaldt

It is certified that error appears in the above-identified patent and that said Letters Patent are hereby corrected as shown below:

In Column 22, Claim 1, line 4 below the structural formula, "β-methylbenzyl" should read --- α-methylbenzyl".

Signed and sealed this 23rd day of January 1973.

(SEAL)
Attest:

EDWARD M. FLETCHER, JR.
Attesting Officer

ROBERT GOTTSCHALK
Commissioner of Patents